United States Patent [19]
Chang et al.

[11] Patent Number: 5,849,096
[45] Date of Patent: Dec. 15, 1998

[54] METHOD FOR CLEANING WHEELS OF CAR FOR SEMICONDUCTOR DEVICE MANUFACTURING

[75] Inventors: Nick Chang; Chung-Yea Lee, both of Hsin Chu, Taiwan

[73] Assignee: Taiwan Semiconductor Manufacturing Company Ltd., Hsin-Chu, Taiwan

[21] Appl. No.: 668,712

[22] Filed: Jun. 24, 1996

[51] Int. Cl.[6] .................. B08B 1/02; B08B 5/04; B60S 1/66; B60S 1/68

[52] U.S. Cl. .................. 134/6; 134/6; 134/21; 134/32; 134/33; 134/25.4; 15/3; 15/53.4; 15/80.2; 15/97.3; 15/301; 15/311

[58] Field of Search .................. 134/6, 32, 33, 134/9, 15, 25.4, 21; 15/3, 53.4, 80.2, 97.3, 301, 311

[56] References Cited

U.S. PATENT DOCUMENTS

| | | | |
|---|---|---|---|
| 3,681,805 | 8/1972 | Shelstad et al. | 15/53.4 |
| 5,261,433 | 11/1993 | Smith | 134/123 |
| 5,264,374 | 11/1993 | Watanabe et al. | 437/2 |
| 5,349,714 | 9/1994 | Korbonski et al. | 15/3 |

*Primary Examiner*—Zeinab El-Arini
*Attorney, Agent, or Firm*—George O. Saile; Stephen B. Ackerman; William J. Robertson

[57] ABSTRACT

A method for cleaning the wheels of a car used in a semiconductor manufacturing plant uses a pair of endless belts that carry a dust trapping material on their outer surfaces. The car is located with a wheel supported by two rollers that each carry one of the belts. One of the rollers is turned and as the wheel rides in a gap between the two belts it turns with the first belt and transfers a turning motion to the other belt. As the wheel turns with the belts, dust on the wheel is transferred to the belts.

3 Claims, 2 Drawing Sheets

METHOD FOR CLEANING WHEELS OF CAR FOR SEMICONDUCTOR DEVICE MANUFACTURING

FIELD OF THE INVENTION

This invention relates generally to apparatus for use in manufacturing semiconductor devices. More specifically it relates to apparatus for cleaning the wheels of a car that transports semiconductor devices during manufacturing.

1. Introduction

It is a familiar problem in manufacturing semiconductor devices that the devices and the manufacturing apparatus must be kept clean. As a relevant example, wheeled vehicles, called cars, are used for carrying semiconductor devices and associated apparatus between stations in a manufacturing plant. The cars, like other manufacturing apparatus, must be kept clean. More specifically, the wheels tend to collect dust and it is a common practice to clean the wheels to remove the dust.

Commonly, these cars are pushed by a human operator and such a car will be the simplest example for understanding the invention. However, the invention will be useful with cars having various degrees of automation.

2. The Prior Art

In one prior art technique for cleaning the wheels of a car, the car is rolled across a sticky mat. Dust on the wheel treads sticks to the mat and is thereby removed from the wheels. One problem with the sticky mat is that the car usually follows the same path and this part of the mat becomes quickly filled with dust. Commonly, the mat must be replaced once or twice a day at a significant cost in labor.

U.S. Pat. No. 5,261,433 teaches an apparatus for washing the wheels of a vehicle.

SUMMARY OF THE INVENTION

A general object of this invention is to provide a new and improved apparatus for cleaning a wheel. A more specific object is to provide a new and improved apparatus for removing dust particles from the tread of the wheels of a car used in semiconductor manufacturing.

The cleaning apparatus of this invention has a support that the car rolls onto for cleaning. The support is an extension of the surface the car otherwise rides along. Other components of the cleaning apparatus are attached to the support.

The apparatus cleans the two front wheels of the car and then cleans the two rear wheels. (As with most wheeled vehicles of this general type, the car has two coaxial front wheels and two coaxial rear wheels and pairs of wheels have substantially the same side to side spacing.)

Two pairs of rollers, one pair for each of the two wheels being cleaned together, are attached to the support in a position to receive the two wheels that are to be cleaned. The two rollers for the same wheel are spaced apart an appropriate distance along the path of the car so that each front or rear wheel can be positioned in the gap between its two rollers so as to be supported by both rollers.

Each wheel supporting roller cooperates with an idler roller to carry an endless belt with a suitable cleaning surface, such as the sticky material used in the form of a mat in the prior art described above. Another material that has been found suitable is a belt with a rough surface made of rubber. One of the belts is driven by an electric motor. The wheel being cleaned turns with the driven belt and it has sufficient frictional engagement with the other belt to turn it.

The belts are removed and cleaned or replaced as necessary. Commonly they are cleaned after a predetermined number of hours of use. One of the objects of the invention is to simplify the operation of changing a belt.

Other objects and features of the invention will appear in the description of a preferred embodiment of the invention: the apparatus is easy and safe to operate; it is easy to maintain; and it is easy to operate manually and it can be made to operate automatically.

THE DRAWING

THE PREFERRED EMBODIMENT

Introduction

Figure 3:
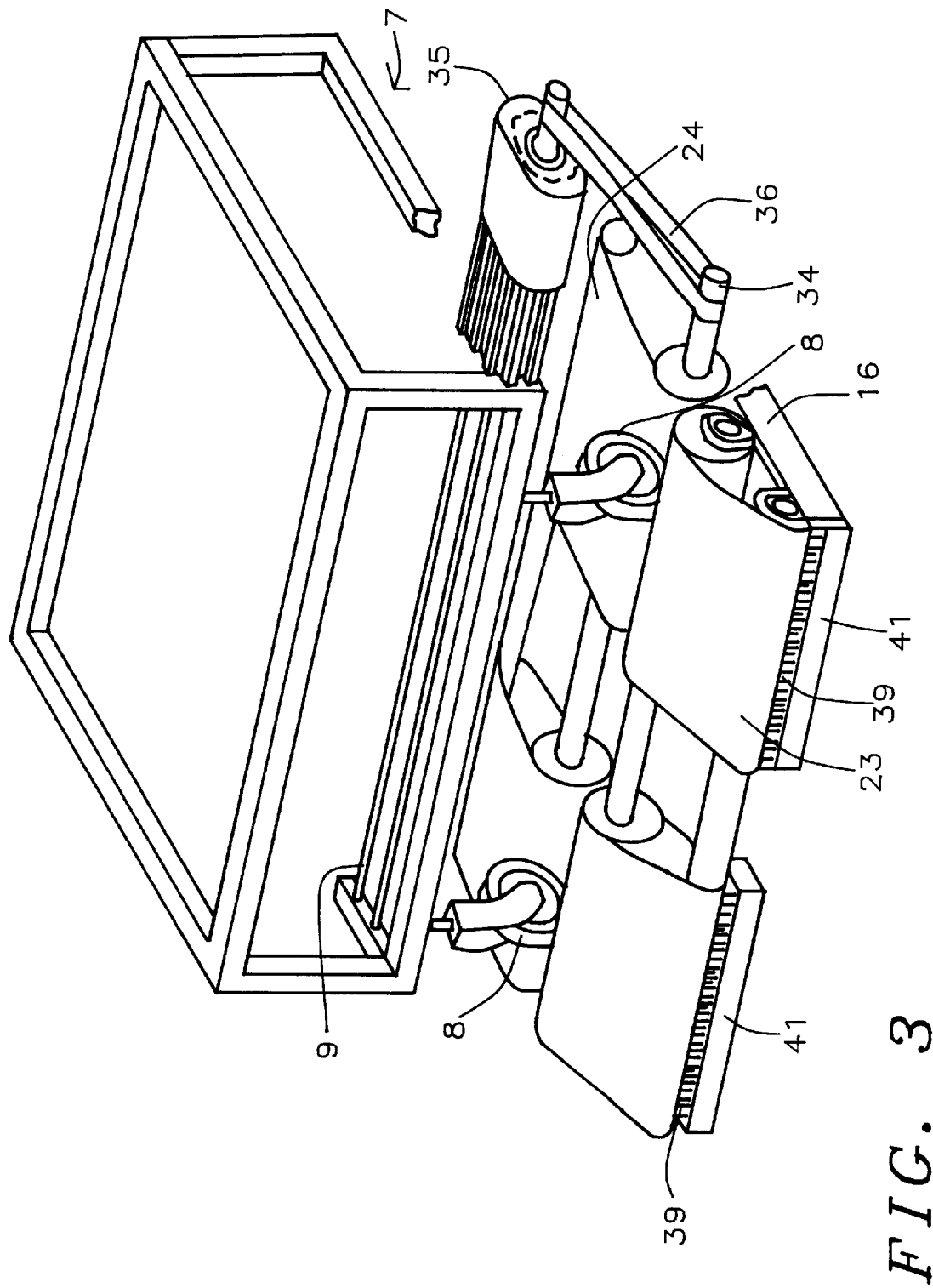
FIG. 3 is an isometric partial view of the apparatus of FIG. 1 and a car having its wheels cleaned.

FIG. 3 shows a partial view of a car 7 that would be cleaned with the apparatus of this invention. It has a generally open rectangular frame with a pair of wheels 8 located near the front. A similar pair of wheels (not shown) is located at the back. The bottom of the car is formed by rods 9 that support semiconductor components. The car is representative of a variety of cars that can be cleaned with the apparatus of this invention, but details of the car such as rods 9 are optional.

The Car Path at the Cleaning Station

Figure 1:
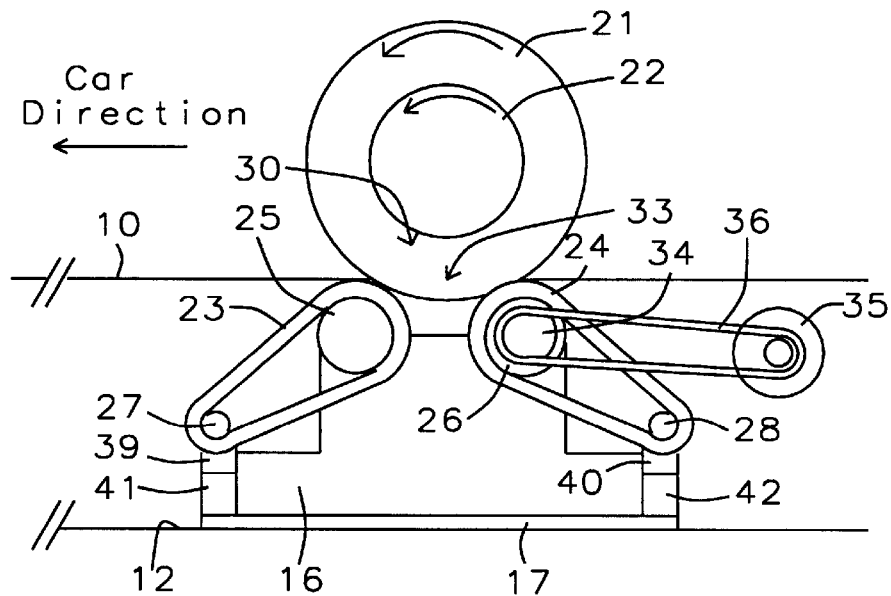
FIG. 1 is a side view of the cleaning apparatus of this invention.

A horizontal line 10 in FIG. 1 denotes the upper surface of a support 11 that the car rolls along as it passes through the cleaning station. Ordinarily the path of the car is along a conveyer system, and the upper surface of 10 of support 11 is a continuation of this surface.

The Support Structure of the Cleaning Apparatus

At the cleaning station, a suitable space is provided for locating other components of the apparatus below the surface 10 of support 11. As FIG. 1 shows, the preferred cleaning apparatus is supported on a surface 12 that is preferably about 120 mm below the car path surface 10.

Figure 2:
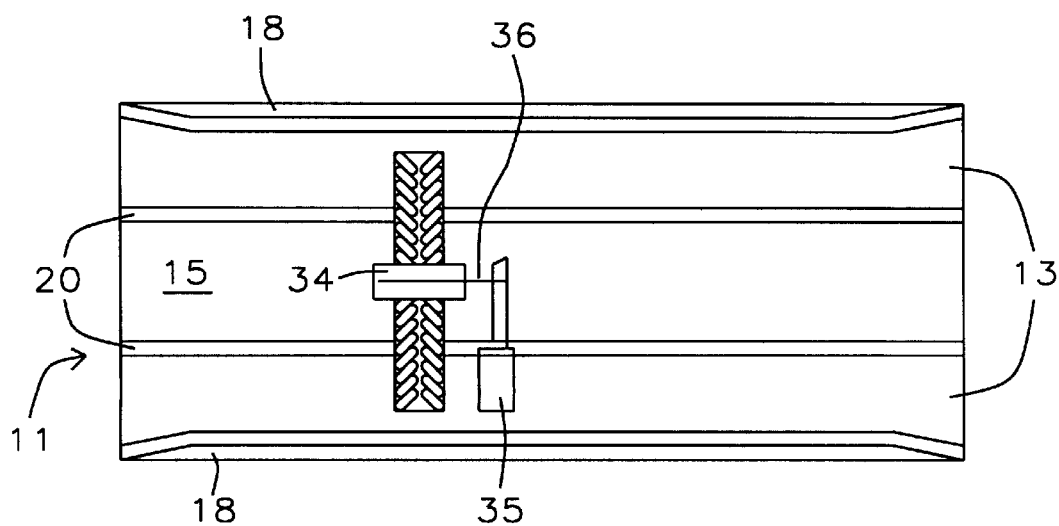
FIG. 2 is a top view of the apparatus of FIG. 1.

As FIG. 2 shows, structure 11 is formed as spaced apart symmetrical right and left path forming elements 13. Elements 13 are spaced apart according to the distance between the front wheels 8 or rear wheels of the car, and they are separated sufficiently to provide an entryway 15 for access to components of the wheel cleaning apparatus by an operator or maintenance person. The entryway may be at the level of surface 12 or it can be made lower. The operator can access components of the cleaning station from one preselected direction or from either direction, depending on the space provided ahead and behind the apparatus.

The car support 11 is attached to a general supporting structure 16. Structure 16 rests on a pad 17 that lies on the floor 12. The pad helps to isolate the car from vibration. Structure 16 is adapted to form an enclosure for establishing a low vacuum near the wheels as part of an air shower to trap dust from the wheels, as is conventional for cleaning. Supporting tructure 16 uses techniques common for roller and belt structures and will be readily understood from the simplified drawings of FIGS. 1 and 3.

As FIG. 2 shows, guide bars 18 are attached at the outside edges of the right and left path forming elements 13 to assist in keeping the car positioned in the path. As a general indication of the size of the apparatus, the guide bars are about 100 cm apart.

Two strips of marking tape 20 are along the edge of the path, at the side of the operator entryway. The stripes guide the person pushing the car.

The Wheel Tread Cleaning Components

Two circles 21, 22 in FIG. 1 represent the outline of wheels 8 of a range of sizes at the cleaning station. The preferred diameters are 7.8 cm and 10.5 cm. Arcuate arrows show the direction of rotation of the wheels during the cleaning operation.

At the cleaning station, a wheel 8 rides on two endless belts 23, 24 that each have an outer cleaning surface. The belts are supported between upper rollers 25, 26 which are located under the wheels 8 and lower rollers 27, 28. The upper rollers are spaced apart in the direction of the cart path to form a gap 30 that the wheels ride in during the cleaning process. Note that the car rises slightly as the wheels travel over the rear roller and belt and then drop slightly into the gap. (The rise is about 0.3 cm and the drop is about 0.6 cm.)

The upper rollers 25, 26 project slightly above the surface of the track 11, and they have a diameter to provide a suitably smooth ride over the top of the rear roller 26 as a pair of wheels slide into the gap 30. As a specific example, the upper rollers have a diameter of 4.5 cm. The lower rollers 27, 28 have a suitable diameter to carry the belt, preferably 2.0 cm.

A light source and photo sensor system 33 is mounted on the enclosure to detect the presence of a wheel in gap 30. The signal from the photo sensor can be used to start the cleaning operation by starting a motor (35 described later) for a timed or otherwise controlled operation.

The Drive System for Belts 23, 24

The upper and lower rollers 25–28 are mounted to rotate in structure 16. As FIG. 2 shows, the cleaning apparatus has a separate belt and roller assembly for the right and left wheels 8 and the right and left rollers are interconnected to be rotated together. The details of the mounting structures are conventional and the mounting structures are shown schematically in FIG. 1.

One roller, upper roller 26 in FIG. 1, carries a pulley 34 for being driven from an electric motor 35 through a belt 36.

The drive system can be arranged in any suitable way. FIG. 3 shows motor 35, pulley 34 and belt 36 located near the outside of the track 11, and FIG. 2 shows the pulley and belt located in the entryway.

The Belt Cleaning Brush

Two brushes 39, 40 are mounted to scrub dust from the surfaces of the belts. As FIG. 1 shows, a brush is mounted on a support 41 or 42. The supports are removably attached to enclosure 16 and can be removed for cleaning or replacing the brushes.

Other Embodiments

From the description of the preferred embodiment of the invention, those skilled in the art will recognize various modifications within the spirit of the invention and the intended scope of the claims.

We claim:

1. A method for cleaning a wheel of a vehicle that is used in a semiconductor manufacturing plant, comprising the following steps:

propelling the car along a floor to a cleaning position;

providing at the cleaning position a first and a second cleaning belt each having an outer cleaning surface and an inner surface, and each being supported by an upper roller and a lower roller, each of the rollers having an outer surface in frictional contact with the inner surface of the associated first or second belt, the outer surface of each upper roller being near the level of the floor, the upper rollers being spaced apart to form a gap for receiving a wheel of the car;

positioning the car with a wheel to be cleaned located in the gap and supported by the upper rollers and riding on the outer surfaces of the first and second belts; and driving one of the rollers to turn the wheel by friction between the wheel and the first cleaning belt, the turning wheel turning the second belt by friction between the wheel and the second belt, the outer surface of each belt being adapted to clean the wheel as the wheel turns on the belts.

2. The method of claim 1 wherein the cleaning belts accumulate dust as the wheel is cleaned and the method includes the step of positioning a first and a second brush to clean dust from the outer cleaning surface of each belt.

3. The method of claim 2 including establishing a low vacuum near the wheels as part of an air shower to trap dust from the wheels.

* * * * *